US008746525B2

(12) United States Patent
Pepin et al.

(10) Patent No.: US 8,746,525 B2
(45) Date of Patent: Jun. 10, 2014

(54) BLADELESS OPTICAL FIBER CLEAVER

(75) Inventors: Ronald P. Pepin, Georgetown, TX (US);
Martin G. Afflerbaugh, Austin, TX (US); Richard L. Simmons, Leander, TX (US); James R. Bylander, Austin, TX (US); Donald K. Larson, Cedar Park, TX (US); Mark R. Richmond, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 139 days.

(21) Appl. No.: 13/260,852

(22) PCT Filed: Apr. 1, 2010

(86) PCT No.: PCT/US2010/029590
§ 371 (c)(1),
(2), (4) Date: Sep. 28, 2011

(87) PCT Pub. No.: WO2010/120570
PCT Pub. Date: Oct. 21, 2010

(65) Prior Publication Data
US 2012/0018482 A1 Jan. 26, 2012

Related U.S. Application Data

(60) Provisional application No. 61/170,152, filed on Apr. 17, 2009.

(51) Int. Cl.
*G02B 6/00* (2006.01)
*B65H 35/00* (2006.01)

(52) U.S. Cl.
USPC .............................. 225/96.5; 225/97; 385/134

(58) Field of Classification Search
USPC .............. 225/96.5, 97; 385/137, 136, 76, 134
See application file for complete search history.

(56) References Cited

U.S. PATENT DOCUMENTS

| 4,621,754 | A | * | 11/1986 | Long et al. ...................... 225/96 |
| 4,627,561 | A | | 12/1986 | Balyasny et al. |
| 4,667,862 | A | * | 5/1987 | Millar et al. ...................... 225/2 |
| 4,730,763 | A | | 3/1988 | Smith |
| 4,790,465 | A | | 12/1988 | Fellows et al. |
| 5,080,460 | A | | 1/1992 | Erdman et al. |
| 5,088,637 | A | * | 2/1992 | Teurlings .......................... 225/1 |
| 5,088,804 | A | | 2/1992 | Grinderslev |
| 5,102,211 | A | | 4/1992 | Slaney et al. |

(Continued)

FOREIGN PATENT DOCUMENTS

| JP | 62-007004 A2 | 1/1987 |
| JP | 11-263635 A | 9/1999 |

(Continued)

*Primary Examiner* — Omar Flores Sanchez
(74) *Attorney, Agent, or Firm* — Kristofor L. Storvick

(57) ABSTRACT

A bladeless optical fiber cleaver includes a first clamp and a second clamp coupled to each other via a generally support tray, where the second clamp is movable with respect to the first clamp along an axis of the optical fiber. The first and second clamps each receive a portion of the optical fiber. The fiber cleaver includes a mechanism to create a tension force in a stripped portion of the optical fiber, where the stripped portion of the fiber under tension is exposed to receive contact from a flexible abrasive material, the flexible abrasive material introducing a flaw in the optical fiber where the cleave takes place.

8 Claims, 7 Drawing Sheets

(56) References Cited

U.S. PATENT DOCUMENTS

| | | | |
|---|---|---|---|
| 5,337,390 A | 8/1994 | Henson et al. | |
| 5,395,025 A | 3/1995 | Borer | |
| 5,408,558 A | 4/1995 | Fan | |
| 5,414,790 A | 5/1995 | Lee et al. | |
| 5,563,974 A | 10/1996 | Carpenter et al. | |
| 5,813,902 A | 9/1998 | Wiegand | |
| 5,862,289 A | 1/1999 | Walter et al. | |
| 6,078,719 A | 6/2000 | Wiegand | |
| 6,099,392 A | 8/2000 | Wiegand | |
| 6,565,265 B2 | 5/2003 | Ohtsuka et al. | |
| 6,628,879 B2 | 9/2003 | Robinson et al. | |
| 6,634,079 B1 | 10/2003 | Kazama | |
| 6,754,426 B2 * | 6/2004 | Lee et al. | 385/136 |
| 6,846,111 B2 | 1/2005 | Otsu et al. | |
| 7,116,882 B2 | 10/2006 | Watte et al. | |
| 7,140,950 B1 | 11/2006 | Bylander et al. | |
| 7,194,179 B1 | 3/2007 | Bryant et al. | |
| 7,280,733 B2 | 10/2007 | Larson et al. | |
| 7,391,951 B2 * | 6/2008 | Hayashi et al. | 385/134 |
| 7,669,744 B2 | 3/2010 | Yazaki et al. | |
| 8,254,739 B2 * | 8/2012 | Bylander et al. | 385/134 |
| 8,306,382 B2 * | 11/2012 | Raker et al. | 385/135 |
| 8,442,375 B2 * | 5/2013 | Bylander et al. | 385/134 |
| 2001/0033730 A1 | 10/2001 | Fentress | |
| 2003/0063868 A1 | 4/2003 | Fentress | |
| 2004/0120678 A1 | 6/2004 | Hwang et al. | |
| 2006/0263028 A1 * | 11/2006 | Honma | 385/134 |
| 2008/0226236 A1 | 9/2008 | Pepin et al. | |
| 2008/0310812 A1 * | 12/2008 | Watte et al. | 385/137 |
| 2012/0141082 A1 * | 6/2012 | Sawicki et al. | 385/134 |

FOREIGN PATENT DOCUMENTS

| | | |
|---|---|---|
| JP | 2002-341181 A | 11/2002 |
| JP | 2005-055479 A | 3/2005 |
| WO | WO 2009/035776 A1 | 3/2009 |
| WO | WO 2010/088184 A2 | 8/2010 |

* cited by examiner

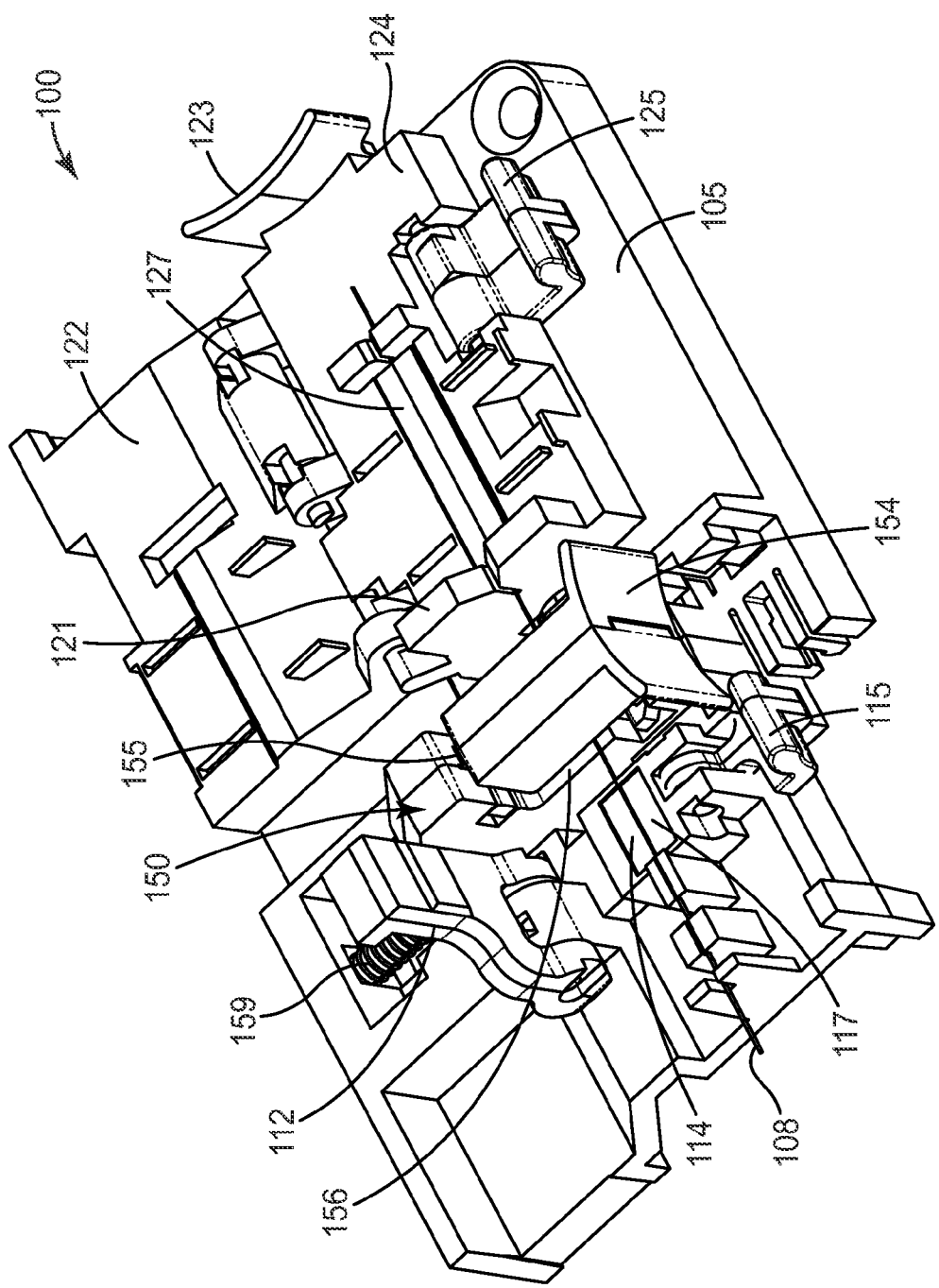

BLADELESS OPTICAL FIBER CLEAVER

CROSS REFERNCE TO RELATED APPLICATIONS

This application a national stage filing under 35 U.S.C. 371 of PCT/US2010/029590, filed Apr. 1, 2010, which claims priority to U.S. Provisional Application No. 61/170152, filed Apr. 17, 2009, the disclosure of which is incorporated by reference in its/their entirety herein.

BACKGROUND OF THE INVENTION

1. Field of the Invention

The present invention is directed to an apparatus for cleaving an optical fiber, in particular, an optical fiber to be terminated and polished in the field.

2. Background

In the area of optical telecommunication networks, it is often necessary to connect one optical fiber to another. Conventional connections include fusion splices, mechanical splices and plug/unplug-type connections. Oftentimes it is necessary to prepare connections in a field environment. When making such connections in the field, it may be necessary to cut or cleave an optical fiber as part of the fiber preparation process.

Current portable optical fiber cleavers are expensive, precision mechanisms that typically include two main features. First, conventional cleavers have a mechanism for placing a controlled strain on the optical fiber, through tension, bending, torsion or a combination of tension, bending, and torsion. Second, conventional cleavers have a rigid blade, typically made from diamond or other hard material, for creating a flaw on the surface of the fiber. These blades can add significant cost and, in many cases, may require regular maintenance. Also, with a rigid blade, care must be taken not to damage the fiber as it is possible for the blade to impact the optical fiber with too much force. Some conventional fiber cleavers are described in U.S. Pat. Nos. 6,634,079; 6,628,879; and 4,790,465. Laser cleavers are also known and are utilized primarily in a factory or other controlled environment.

SUMMARY

According to an exemplary aspect of the present invention, a bladeless optical fiber cleaver is provided for cleaving an optical fiber in a straightforward manner. The bladeless optical fiber cleaver includes a first clamp and a second clamp coupled to each other via a generally planar support tray, where the second clamp is movable with respect to the first clamp along an axis of the optical fiber. The first and second clamps each receive a portion of the optical fiber. The fiber cleaver includes a mechanism to create a tension force in a stripped portion of the optical fiber, where the stripped portion of the fiber under strain is exposed to receive contact from a flexible abrasive material, the flexible abrasive material introducing a flaw in the optical fiber where the cleave takes place.

In another aspect, the flexible abrasive material is disposed on a shuttle device that laterally moves across the fiber axis from a first position to a second position on the tray. While moving the shuttle device from the first position to the second position, the flexible abrasive material contacts the optical fiber. In another preferred aspect, the shuttle device triggers the tension force mechanism, which can comprise a spring, to generate the tension force to cleave the fiber.

In another aspect, the flexible abrasive material can comprise one of an abrasive material coated metal wire and an abrasive material coated filament.

In another aspect, the flexible abrasive material comprises one of a sand paper, a lapping film, or a string.

In another aspect, the first clamp can be configured to temporarily secure a first portion of the fiber and the second clamp can be configured to temporarily secure a second portion of the fiber. The abrasive material can contact a stripped portion of the fiber disposed between the first clamp and the second clamp to introduce the flaw.

In another aspect, at least one of the first clamp and second clamp comprises a magnetic clamp. In another aspect, the spring places an axial strain onto the fiber of from about 100 grams to about 300 grams, and in a further aspect, from about 200 grams to about 250 grams.

According to another exemplary aspect of the present invention, a method of cleaving an optical fiber comprises providing an optical fiber cleaver that includes a first clamp and a second clamp coupled to each other via a generally planar support tray, wherein the second clamp is movable with respect to the first clamp along an axis of the optical fiber, and a mechanism to create a tension force in a stripped portion of the optical fiber. The method includes stripping a portion of the fiber. The method also includes positioning a first part of the optical fiber in the first clamp and extending the stripped portion of the optical fiber onto the second clamp. The method also includes applying a portion of the flexible abrasive material to a surface of the stripped fiber, where the flexible abrasive material is disposed on a shuttle device that laterally moves from a first position to a second position across the tray. While moving the shuttle device from the first position to the second position, the flexible abrasive material contacts the surface of the optical fiber. The shuttle device can trigger the tension force mechanism to generate the axial tension force.

In another aspect, the flaw is created prior to placing the optical fiber under strain.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIG. 1C is another isometric view of the cleaver device of FIG. 1A with the clamps in an open position.

Figure 1A:
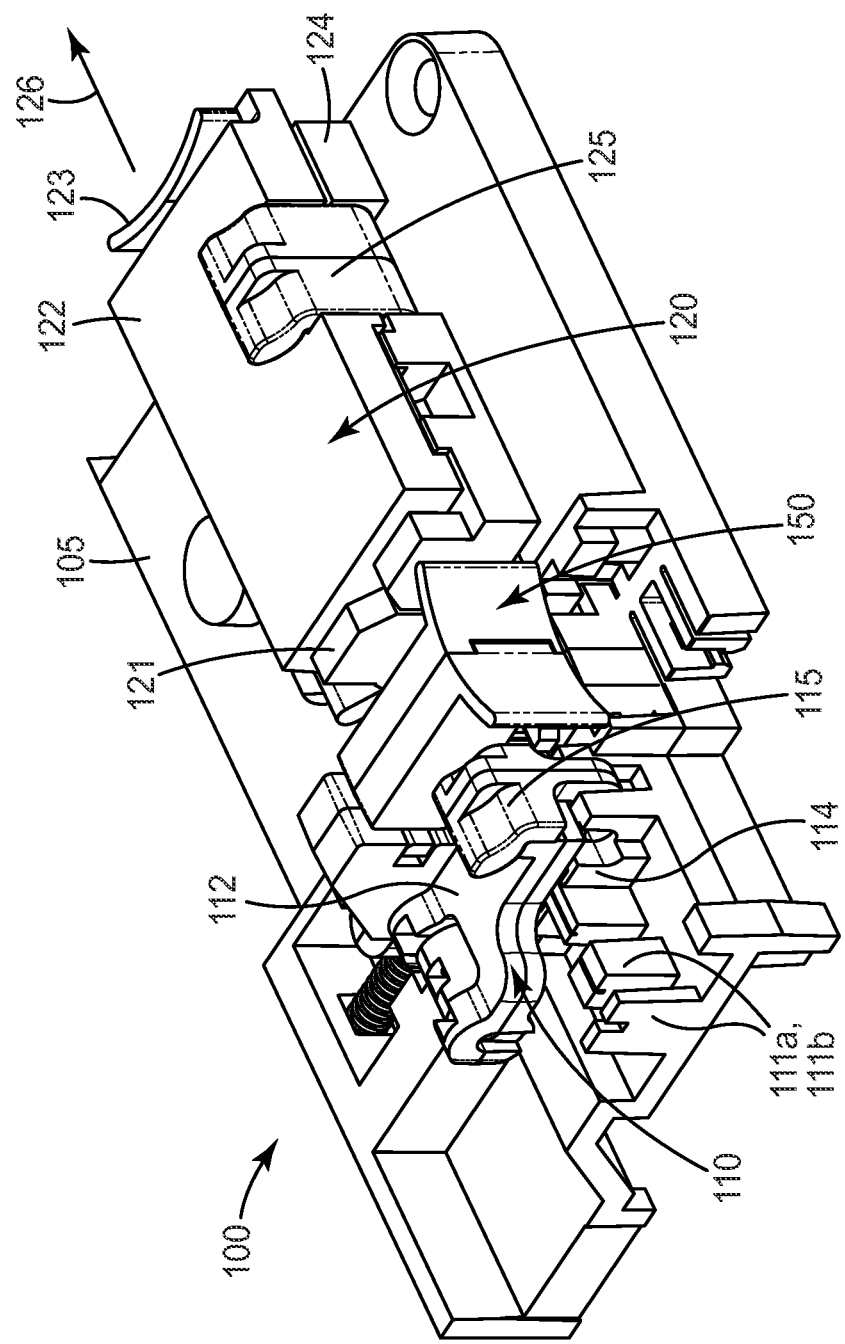
FIG. 1A is an isometric view of a cleaver device according to an aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to a bladeless apparatus for cleaving an optical fiber in a simple and inexpensive manner that is suitable for field operations. In short, an optical fiber can be placed under axial tension using the embodiments described herein and cleaved with a flexible abrasive, such as a diamond-coated wire, that introduces a flaw in the optical fiber. The cleaver embodiments described herein can be utilized with field terminable connectors or fusion splicing devices.

Figure 1B:
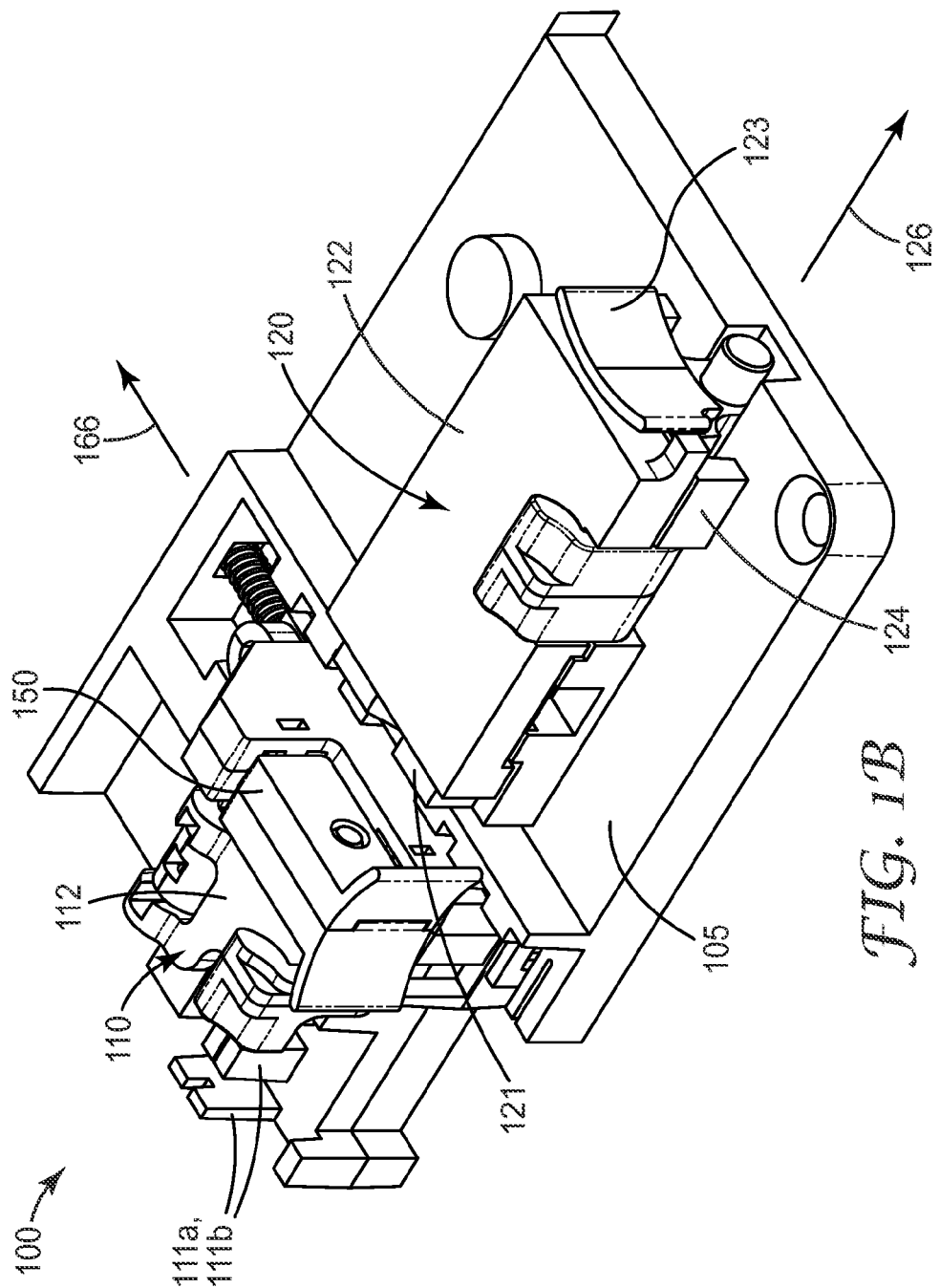
FIG. 1B is another isometric view of the cleaver device of FIG. 1A.

A cleaver device 100, and components thereof, often referred to herein as cleaver 100, are shown in FIGS. 1A-1C. Cleaver 100 is a bladeless, portable fiber cleaving device that provides suitable tension to permit optical fiber cleaving through use of an abrasive material, such as a wire coated with an abrasive. Cleaver 100 includes a generally planar body that includes first and second clamps 110 and 120 that are disposed on a tray 105. The first and second clamps are configured to align and hold an optical fiber 108 (see FIG. 1C) to be cleaved. In a preferred aspect, tray 105 and components thereof can be formed or molded from a polymer material, such as a plastic, although metal and other suitably rigid materials can also be utilized.

Cleaver 100 also includes a shuttle device 150 that is disposed on tray 105 between the first and second clamps. Shuttle device 150 holds the abrasive material and is configured to move laterally across the optical fiber being cleaved. A tension or strain mechanism, shown in more detail in FIGS. 3A-3C, places the optical fiber under axial strain. The movement of the shuttle device 150 across the fiber, and thus the flexible abrasive material across the fiber, introduces a flaw on the surface of the fiber that causes the strained fiber to cleave.

In more detail, cleaver 100 includes first and second clamps 110, 120 to hold the fiber in place prior to cleaving. As shown in FIGS. 1A-1C, the clamps can be configured as conventional plate-type clamps 110 and 120 that can be utilized to hold optical fiber 108. Fiber 108 can be a conventional optical fiber, such as a standard single mode or multimode optical fiber, such as SMF 28 (available from Corning Inc.).

The first clamp 110 (shown in an open position in FIG. 1C and in a closed position in FIGS. 1A and 1B) can include a top clamp plate 112 and a bottom clamp plate or base 114. The bottom clamp plate 114 can be integrally formed as part of tray 105, such as is shown in the embodiment of FIGS. 1A-1C. Alternatively, the bottom clamp plate 114 can be formed as a separate element that is mounted onto the tray 105. First clamp 110 can further include a latch 115 or similar locking mechanism to keep the clamp in a closed position during the cleaving process. One or more fiber alignment guides, such as guides 111a, 111b, can be formed on or mounted onto tray 105 to help align the optical fiber to be received in fiber clamp 110.

The first clamp 110 can be configured to firmly clamp against either the optical fiber's stripped glass core/clad surface or against the fiber's buffer coated surface. Accordingly, for some aspects, either or both of the top clamp plate 112 and bottom clamp plate 114 can include a compliant material or pad to further grip the fiber surface and/or reduce the likelihood of nicks or flaws being introduced on the surface of the fiber at the first clamp location.

In an alternative aspect, the cleaver device 100 can include multiple clamps positioned before the shuttle device 150. For example, a first clamp can be utilized to clamp onto the fiber's buffer coating, while an additional clamp can be configured to firmly clamp against the optical fiber's stripped glass core/clad surface. These clamps can further protect against rotational or other unwanted movement of the fiber during the cleaving process.

In a further alternative aspect, the first clamp 110 can be part of a separate device, such as a fiber holder assembly, such as described in U.S. Pat. No. 7,280,733. The fiber holder assembly, which can take the form of a tray or sled, can be received (loosely or firmly) by the tray 105 and the fiber clamped therein can be cleaved by device 100. In this manner, a technician in the field can use the cleaver device 100 as part of a multi-tool optical fiber connector termination kit.

Referring back to FIGS. 1A-1C, the second clamp 120 can include a top clamp plate 122 and a bottom clamp plate or base 124. Lock or latch 125 can be used to secure clamp 120 during the clamping process. One or more fiber alignment guides, such as guide 121 can be formed on the clamp 120 or formed onto tray 105 to help further align the optical fiber to as it is being loaded for cleaving.

In a preferred aspect, both the top and bottom plates 122, 124 are formed as components separate from tray 105. In this manner, clamp 120 can be coupled to a tension or strain mechanism, described further below with respect to FIGS. 3A-3C. The tension or strain mechanism pulls/pushes clamp 120 along the fiber axis (e.g., in the direction of arrow 126), away from the first clamp 110 and shuttle device 150, during the cleaving process. Also, in another preferred aspect, clamp 120 is slightly elongated in the axial direction to ensure uniform and sufficient clamping strength on fiber 108 as it is placed under tension. As with the first clamp 110, for some aspects, either or both of the top plate 122 and bottom plate 124 can include a compliant material or pad, such as compliant pad 127. A driver 123, configured to receive a finger pressing force, can be provided on an outer body portion of the clamp 120 to help the field technician place the clamp 120 in the proper axial position prior to cleaving.

In one alternative aspect, one or both clamps 110, 120 can be formed as a magnetic clamp, where a small magnet(s) can be disposed on or within the upper and/or lower clamping plates (thereby eliminating the need for closing latches 115, 125). In another alternative aspect, one or both of clamps 110, 120 can comprise a different structure, such as having a V-groove fiber channel, as would be apparent to one of ordinary skill in the art given the present description.

Figure 2A:
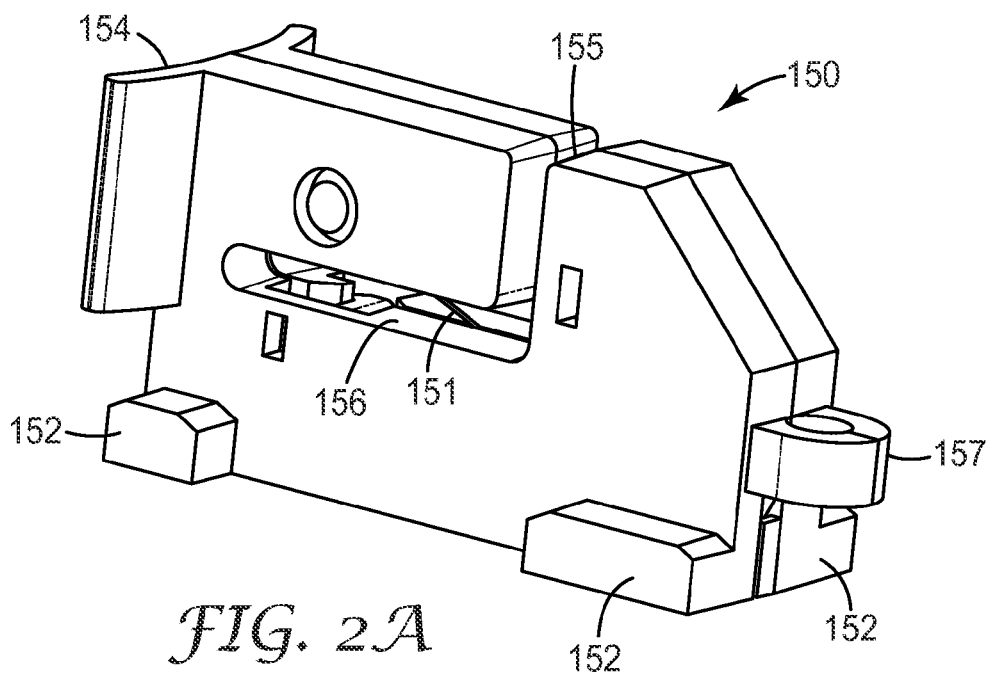
FIG. 2A is an isometric view of a shuttle device component of an exemplary cleaver device according to another aspect of the invention.
Figure 2B:
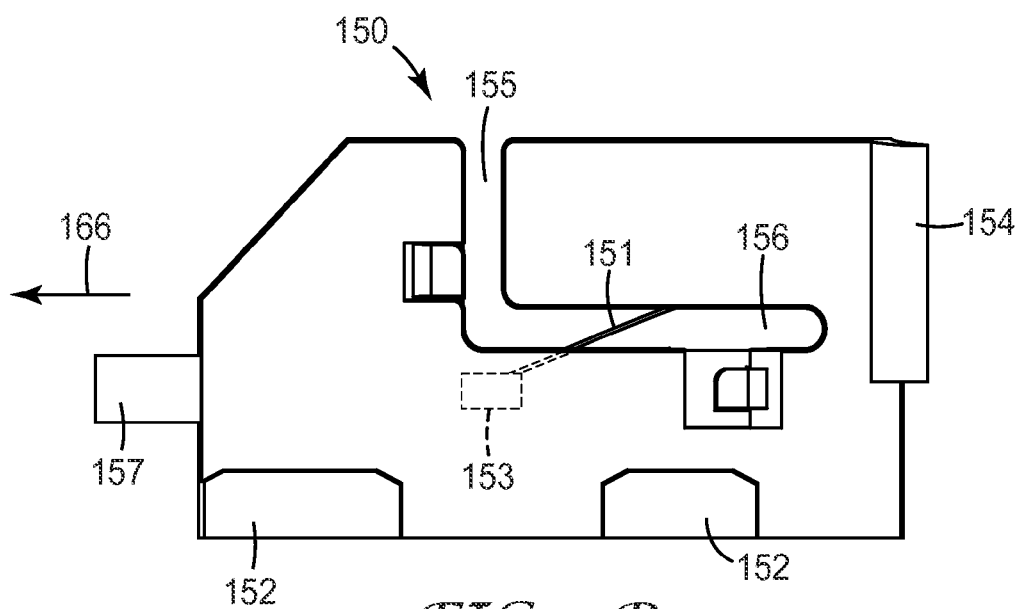
FIG. 2B is a section view of the shuttle device of FIG. 2A.

Cleaver 100 further includes a shuttle device 150 disposed in a track or channel (not shown) formed in the tray 105. The positioning of shuttle device 150 on tray 105 can be understood with reference to FIGS. 1A-1C, while FIGS. 2A and 2B provide a more close-up view of shuttle device 150. The shuttle device 150 holds an abrasive material used to introduce a flaw on the surface of the fiber being cleaved. In an exemplary aspect, the abrasion action can comprise a simple lateral movement of the abrasive material across the stripped fiber surface (e.g., in the direction of arrow 166). The flaw may be applied while the fiber is strained in a controlled manner or alternatively, the flaw may be applied before the fiber is strained.

In a preferred aspect, the abrasive material comprises a flexible abrasive material, such as a metal wire or other filament having an abrasive material coated (either sparsely or densely) on an outer surface or portion thereof. The abrasive material can be a conventional abrasive mineral, such as diamond powders or particles, graphite/carbide powders or particles, or a similar material that is harder than glass. For example, in an exemplary alternative aspect, the flexible abrasive material can comprise a steel wire that is coated with diamond particles. In one example, the steel wire can have a diameter of about 155 µm, with diamond particles of about 20 µm in size.

In another aspect, the flexible abrasive material can comprise a piece of a conventional sand paper sheet, or lapping film, having a grit of about 5 µm or greater. In a preferred aspect, device 100 provides a perpendicular cleave.

In other alternative aspects, the abrasive material can comprise a sheet or ribbon of sand paper, a sheet or ribbon of lapping film, or a string form abrasive.

Referring back to FIGS. 2A and 2B, in a preferred aspect, the abrasive material comprise an abrasive coated wire 151 mounted within the shuttle by a fastener 153, such as a mechanical device or an adhesive. This configuration provides for the wire 151 to supported on one end, leaving the other end free, thus allowing it to flex freely as it comes into contact with the optical fiber during cleaving. This wire flexibility reduces contact forces against the side of the fiber, thereby reducing unwanted torsional or shear forces on the optical fiber, which could detrimentally impact cleave quality.

The shuttle device 150 includes one or more slots to allow clear passage of the optical fiber being cleaved prior to and during movement of the shuttle device. In the aspect of FIGS. 2A and 2B, shuttle device 150 includes a vertical fiber slot 155 and a horizontal fiber slot 156. Moreover, shuttle device 150 can include one or more base structures 152 that are configured to provide stability to the shuttle device 150 as it moves within the track or channel formed on tray 105 during the cleaving process. A driver 154, configured to receive a finger pressing force, can be provided to help the field technician move the shuttle across fiber 108 (FIG. 3C) from a first (pre-cleaved) position to a second position during the cleaving process. In a preferred aspect, the shuttle device can be formed or molded from a polymer material, while the flexible abrasive comprises an abrasive-coated metal wire. As such, the shuttle device 150 can be a disposable component that is replaced after some number of cleaves, for example after 10, 20, or 50 fiber cleaves.

Figure 3A:
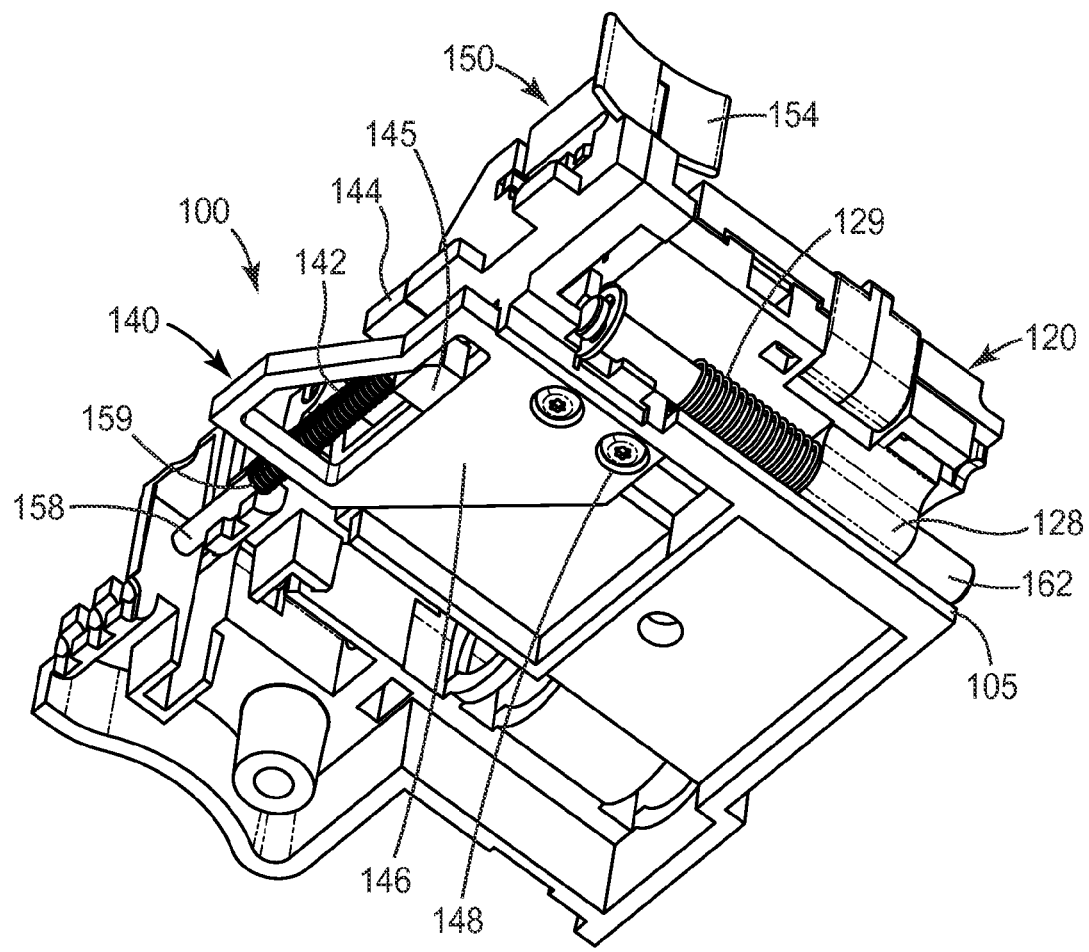
FIG. 3A is an isometric bottom view of a cleaver device having a tension or strain mechanism, where the shuttle device is in a first position according to an aspect of the invention.
Figure 3B:
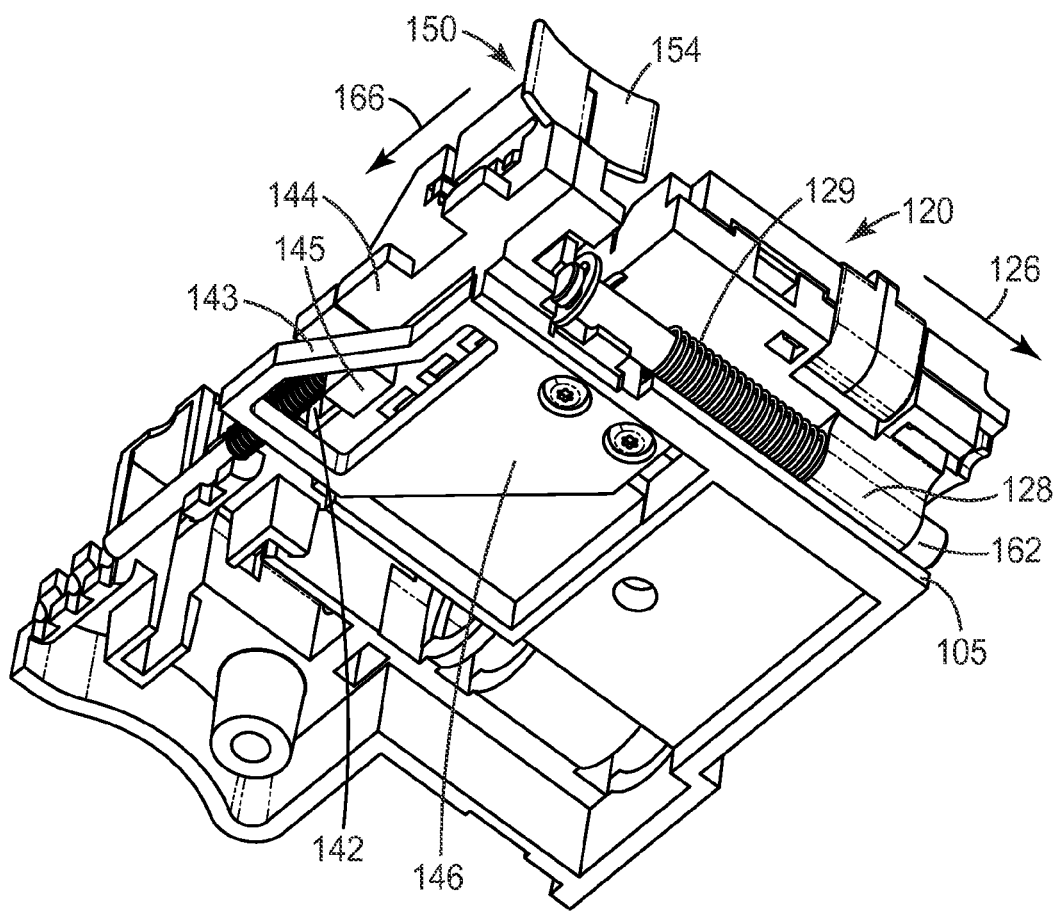
FIG. 3B is another isometric bottom view of a cleaver device having a tension or strain mechanism, where the shuttle device is in an intermediate position according to an aspect of the invention.
Figure 3C:
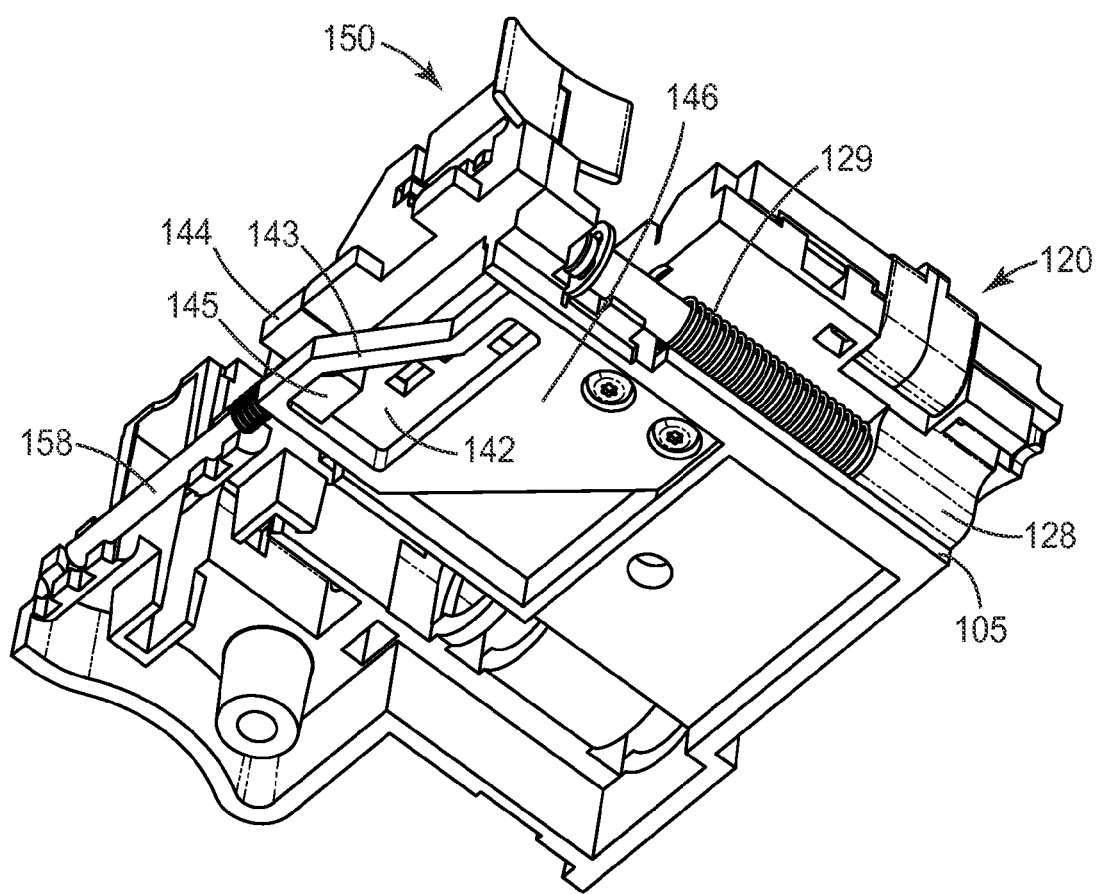
FIG. 3C is an isometric bottom view of a cleaver device having a tension or strain mechanism, where the shuttle device is in a second position according to an aspect of the invention.

FIGS. 3A-3C show partial views of the cleaver 100 from beneath the tray 105 (the tray section supporting the first clamp 110 is omitted for simplicity) to illustrate the controlled tension mechanism. As mentioned above, a tension or strain mechanism places the optical fiber under axial strain during the cleaving process. In more detail, the tension mechanism includes axial spring 129, which is disposed on a rod 162 that is secured to tray 105. Rod 162 is disposed substantially parallel to the optical fiber axis. A portion 128 of clamp plate 124 can include a bore that fits over the rod 162 and contacts the spring 129. The spring 129 presses against the stop piece 128, biasing the clamp 120 in the axial direction (in the direction of arrow 126). Prior to a cleaving operation, the clamp 120 is temporarily secured in a first position (see FIG. 3A), where the spring 129 is substantially compressed. During the cleaving process, the clamp 120 is released to place axial tension on the optical fiber held by clamps 110 and 120.

In this exemplary aspect, a coupling mechanism 140 couples the axial position of the clamp 120 to the lateral position of the shuttle device 150 in a controlled manner for repeatable results. The coupling mechanism 140 is disposed on the bottom surface of tray 105 and couples the clamp 120 to the shuttle device 150. Thus, the coupling mechanism can be configured such that the lateral motion of the shuttle device 150 triggers the release of the second clamp 120 to place the fiber being held in clamps 110 and 120 under axial tension.

In particular, coupling mechanism 140 comprises a plate 146 that is connected to clamp 120 via one or more fasteners 148 mounted onto the bottom plate 124 of clamp 120. Plate 146 also includes an expanded channel or opening 142, having a ramped member or portion 143, which can receive an engagement part 145 of a post 144 that is connected to the shuttle device 150. For example, post 144 can be engaged by mounting member 157 formed at one end of shuttle device 150 (see e.g., FIGS. 2A and 2B). In addition, post 144 engages a bias spring 159 supported by a laterally disposed rod 158 that biases against shuttle device 150. The shuttle bias spring 159 can provide a modest resistance against lateral travel to help reduce an accidental scoring of the optical fiber and an accidental release of the clamp plate 120.

In FIG. 3A, the shuttle device 150 is shown in a first lateral position that corresponds to the clamp 120 being located at a pre-cleave position. In this pre-cleave position, the clamp 120 is prevented from axially moving in the direction of arrow 126 as the plate 146 is restrained by action of the engagement part 145 of post 144 being positioned in the narrow portion of the slot 142. It is at this position that the optical fiber can be mounted onto clamps 110 and 120. To begin the cleaving process, the shuttle device 150 can be moved in the lateral direction (here the direction of arrow 166—see e.g., FIG. 3B). At this intermediate shuttle position, as is shown in FIG. 3B, the engagement part 145 of post 144 can be slid along the slot and is now bounded by the ramp portion 143 of the coupling slot 142. This configuration allows the plate 146/clamp 120 to be free to axially move by the force of spring 129 upon cleaving. In this intermediate position, the clamped optical fiber restrains clamp 120 from movement in the axial direction. At this same intermediate position, the flexible abrasive can be slid across the surface of the optical fiber, introducing a flaw. When the flaw or flaws on the surface become sufficient to reduce the axial strength of the fiber, the axial tension applied by spring 129 can cause the fiber to break, releasing the clamp 120. As shown in FIG. 3C, at a second (or final) lateral position of the shuttle device 150, the fiber has been cleaved, thus the tension applied o the fiber by spring 129 is released while the lateral bias spring 159 is now compressed.

Upon removal of the cleaved fiber portions, the second clamp 120 and shuttle device 150 can be returned to their pre-cleaved positions (e.g., by pressing against driver 123) and a second fiber can be loaded for cleaving.

In an alternative aspect, the axial tension mechanism (e.g., spring 129) can be triggered/released independently from the shuttle movement. For example, a latch or catching mechanism (not shown) can hold the second clamp in a pre-cleave position as the fiber is loaded into the first and second clamps. After clamping, the latch or catch can be released, placing the fiber under axial tension. The shuttle device (with the flexible abrasive) can then be moved laterally across the fiber until a sufficient flaw is introduced, whereupon the fiber is cleaved.

In operation, a cleaving process can take place as follows. A fiber to be cleaved is stripped using a conventional technique. The stripping can leave an exposed glass portion of the fiber of about 60 mm to about 80 mm in length. A first portion of the stripped fiber can be disposed on first clamp 110, while a second portion of the stripped fiber can be disposed on second clamp 120, while the shuttle is placed at the first (pre-cleave) lateral position. An exposed portion of the fiber (i.e., a portion of the stripped fiber not located in either the first or second clamps) can be disposed within the fiber slot 156 of the shuttle device 150. The fiber can then be secured in position across both the first and second clamps 110, 120. The clamps can be held closed using latches 115, 125.

The shuttle device 150 can be moved laterally across the fiber (e.g., in the direction of arrow 166 as shown in FIGS. 2B and 3B), thus releasing the fiber tensioning mechanism coupled to clamp 120. In one aspect, the axial tension should be from about 100 grams to about 300 grams, and more preferably from about 200 grams to about 250 grams for most conventional fibers. With the clamped fiber bearing the axial tension applied by the second body portion, the shuttle's abrasive member can be laterally dragged across the surface of the exposed stripped fiber as the shuttle is laterally moved. With only a very modest force, a flaw is introduced onto the surface of the fiber and the tension creates a fiber break suitable for subsequent field polishing and splicing or connectorization. In a preferred aspect, cleaver 100 provides a substantially perpendicular cleave, within 0-4 degrees of perfect perpendicularity. Such perpendicularity is sufficient for eventual fiber polishing/finishing for field connector termination, such as is described in PCT Application No. PCT/US2010/021980.

Thus, the device of the embodiments described herein provides a low cost, straightforward cleaver to be used for field optical fiber terminations. The cleaver can be utilized as a stand alone tool or as part of a complete fiber termination platform.

Although the present invention has been described with reference to preferred embodiments, workers skilled in the art will recognize that changes may be made in form and detail without departing from the scope of the invention.

What is claimed is:

1. A bladeless optical fiber cleaver device for cleaving an optical fiber, comprising:
    a first clamp and a second clamp coupled to each other via a generally planar support tray, wherein the second clamp is movable with respect to the first clamp along an axis of the optical fiber; wherein the first and second clamps each receive a portion of the optical fiber; and
    an axial tension mechanism to create a tension force in a stripped portion of the optical fiber, wherein the stripped portion of the fiber under tension is exposed to receive contact from a flexible abrasive material, the flexible abrasive material introducing a flaw in the optical fiber, wherein the flexible abrasive material is disposed on a shuttle device disposed on the tray axially between the first clamp and the second clamp that laterally moves across the fiber axis from a first position to a second position on the tray.

2. The bladeless optical fiber cleaver of claim 1, wherein while the shuttle device is moved from the first position to the second position, the flexible abrasive material contacts the optical fiber.

3. The bladeless optical fiber cleaver of claim 1, wherein the shuttle device triggers the release of the axial tension mechanism.

4. The bladeless optical fiber cleaver of claim 1, wherein the axial tension mechanism comprises a spring disposed substantially parallel to the optical fiber axis and coupled to the second clamp to generate a sufficient strain force to cleave the optical fiber.

5. The bladeless optical fiber cleaver of claim 1, wherein the flexible abrasive material comprises one of an abrasive material coated metal wire and an abrasive material coated filament.

6. The bladeless optical fiber cleaver of claim 1, wherein the flexible abrasive material comprises one of a sand paper, a lapping film, or a string.

7. The bladeless optical fiber cleaver of claim 1, wherein the axial tension mechanism places an axial tension on the fiber of from about 100 grams to about 300 grams.

8. The bladeless optical fiber cleaver of claim 1, wherein the axial tension mechanism places an axial tension on the fiber of from about 200 grams to about 250 grams.

* * * * *